(No Model.)

A. KEHLER.
SPLIT BAND PULLEY.

No. 406,287. Patented July 2, 1889.

Witnesses
W. C. Corlies
L. M. Freeman.

Inventor
Amos Kehler.
By L. B. Coupland & Co
Attys.

UNITED STATES PATENT OFFICE.

AMOS KEHLER, OF WARSAW, INDIANA, ASSIGNOR OF ONE-HALF TO WILBUR F. MAISH, OF SAME PLACE.

SPLIT BAND-PULLEY.

SPECIFICATION forming part of Letters Patent No. 406,287, dated July 2, 1889.

Application filed October 27, 1888. Serial No. 289,302. (No model.)

*To all whom it may concern:*

Be it known that I, AMOS KEHLER, of Warsaw, in the county of Kosciusko and State of Indiana, have invented certain new and useful Improvements in a Split Band-Pulley, of which the following is a full, clear, and exact description, that will enable others to make and use the same, reference being had to the accompanying drawings, forming a part of this specification.

This invention relates to improvements in split or separable wood pulleys, as will be hereinafter set forth.

Figure 1:
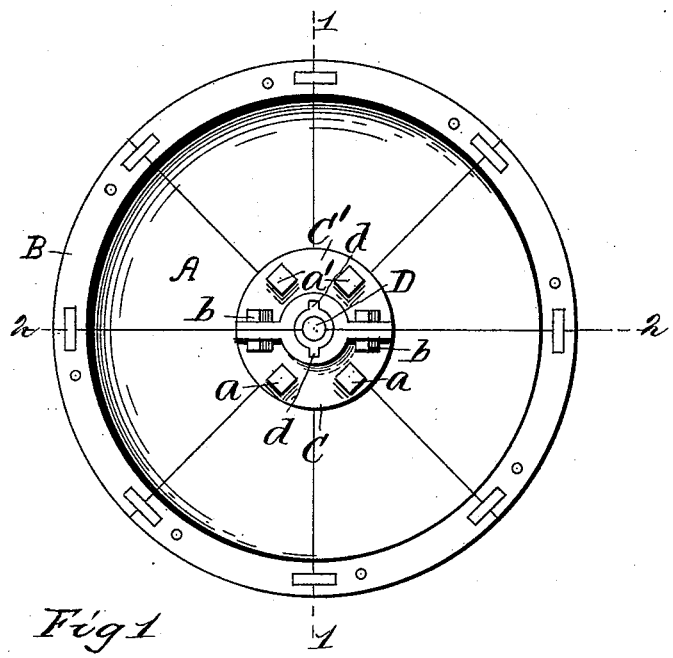
Figure 2:
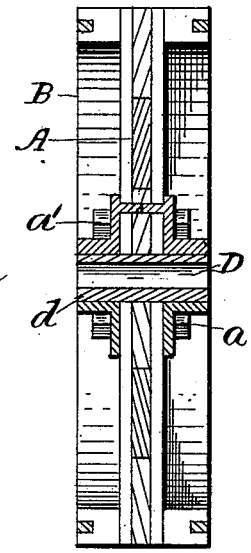
Figure 3:
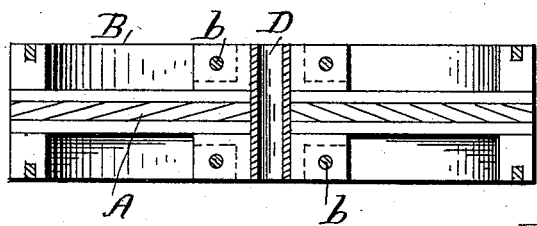
Figures 4, 5, 6:
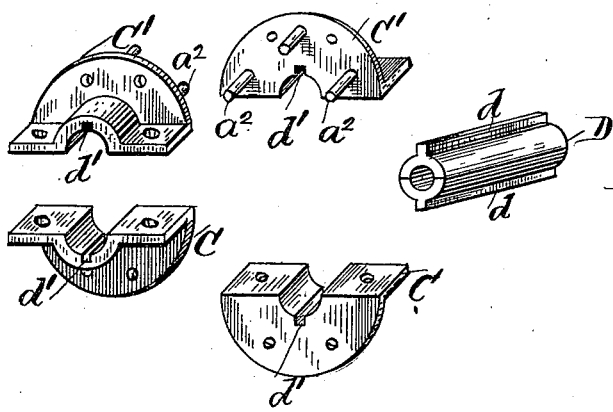

Figure 1 is a side elevation of a pulley embodying my improved features; Fig. 2, a transverse section on line 1 1, Fig. 1. Fig. 3 is a section taken on the line of separation 2 2, Fig. 1. Fig. 4 shows the two parts of the flanged hub placed opposite each other on the same half of the pulley; Fig. 5, the two companion parts, and Fig. 6 a perspective of the hub-bushing.

Referring to the drawings, A represents the web of the pulley, and B the rim, which parts are wholly composed of wood.

The hub of the pulley consists of the semicircular angular flanges C C', located on each side of the pulley and secured to each half of the same by means of the bolts $a$ $a'$. In addition to the bolts $a$ $a'$ for securing the companion parts C C' of the hub, these parts are provided with the dowel-pins $a^2$, which are inserted in the web of the pulley and assist in firmly securing this part of the hub to the corresponding half of the pulley, thus preventing all possibility of the same from working loose on the bolts, and also adapting the same to better resist the heavy strain to which pulleys are subjected. The part C' of the hub is secured to the pulley by the bolts $a'$, so that when uniting the two halves of the pulley together on the shaft this part will spring enough on the bolts to bring the same to a close and perfect union. The clamping-bolts $b$ secure the hub parts and the respective halves of the pulley and lock the same rigidly together.

The bushing D is divided into two parts or halves longitudinally, as shown in Fig. 6. Each half is provided exteriorly and longitudinally with the feather or rib $d$, which fits into and engages with corresponding grooves $d'$, formed in the respective parts of the hub. By this means the two parts of the pulley and hub are firmly secured together in a manner that is best adapted to resist the strain from all points.

Having thus described my invention, what I claim as new, and desire to secure by Letters Patent, is—

In a split pulley, the combination, with the two separable halves thereof, of the flanged hub parts correspondingly divided and provided with grooves, as described, the two-part bushing having a feather formed on each part which engage with the grooves in said flanges, and the bolts for clamping the different parts together, substantially as set forth.

AMOS KEHLER.

Witnesses:
L. M. FREEMAN,
L. B. COUPLAND.